G. G. KETCHAM.
WAGON HAY RACK.
APPLICATION FILED OCT. 8, 1908. RENEWED SEPT. 30, 1910.

992,778.

Patented May 23, 1911.

3 SHEETS—SHEET 1.

Witnesses:

Inventor
George G. Ketcham
By James L. Norris
Atty.

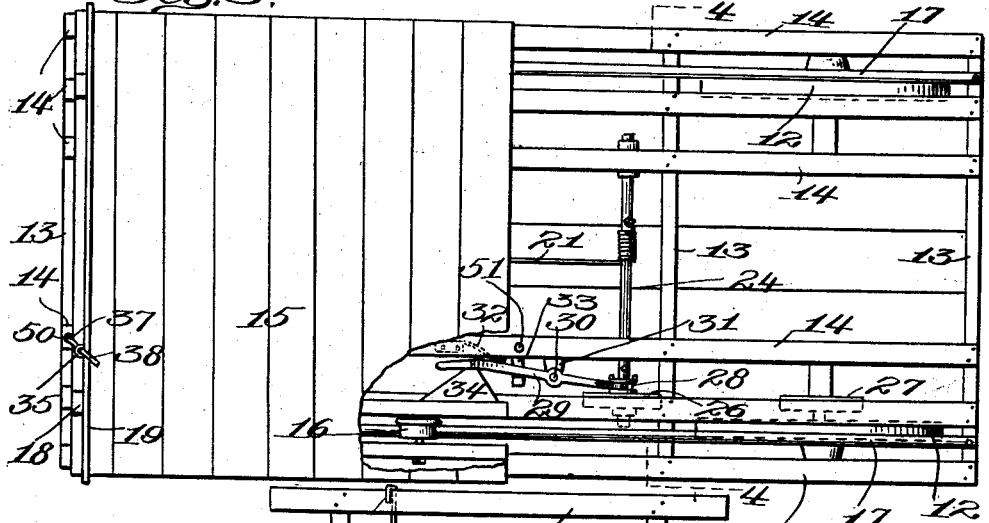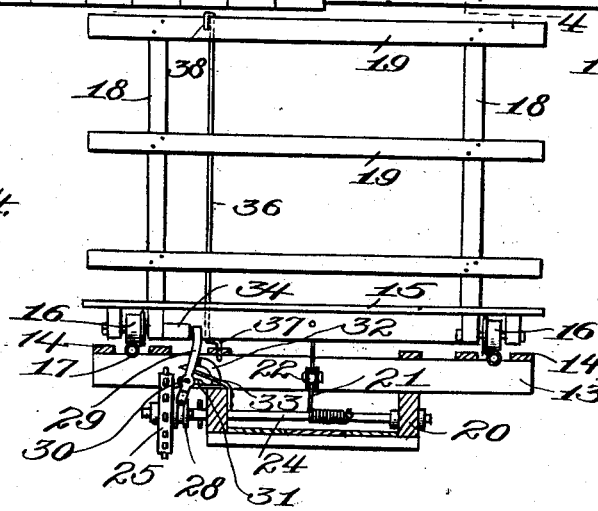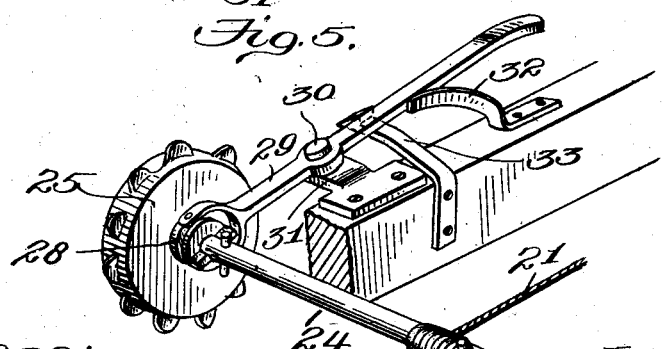

G. G. KETCHAM.
WAGON HAY RACK.
APPLICATION FILED OCT. 8, 1908. RENEWED SEPT. 30, 1910.
992,778.
Patented May 23, 1911.
3 SHEETS—SHEET 3.
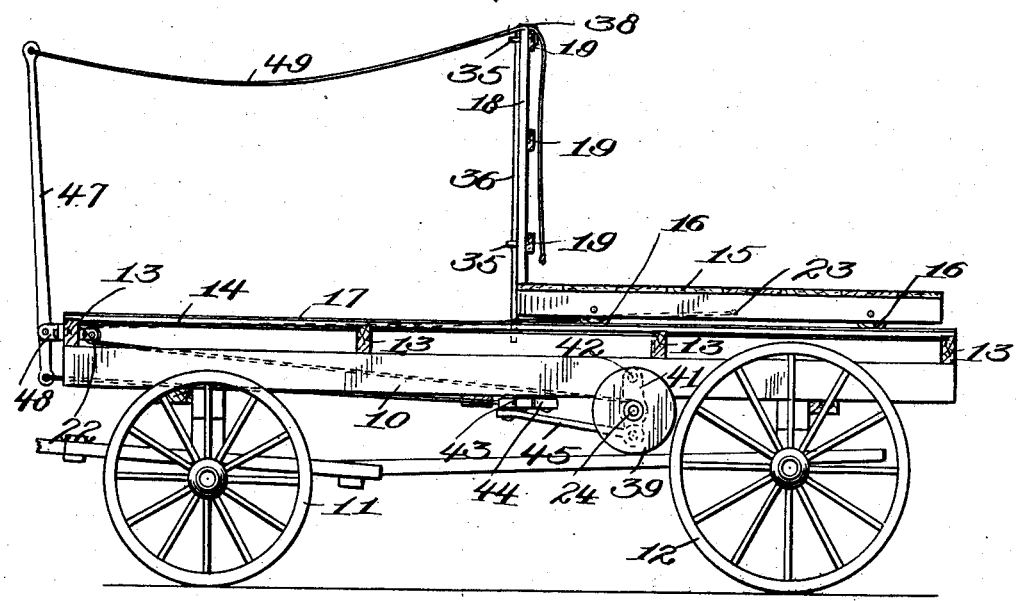
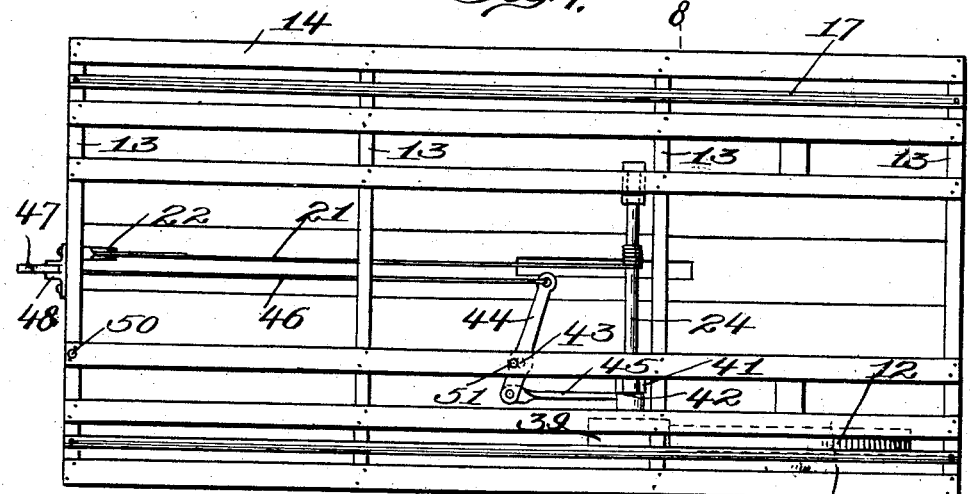
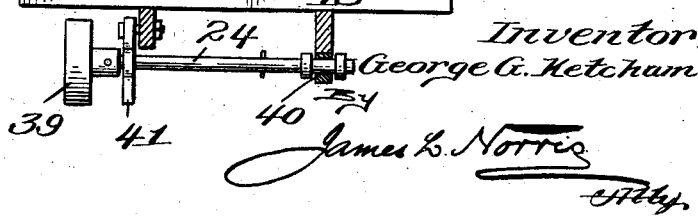
Witnesses:
Inventor
George G. Ketcham
James L. Norris
Atty.

UNITED STATES PATENT OFFICE.

GEORGE G. KETCHAM, OF ANAMOSA, IOWA.

WAGON HAY-RACK.

992,778.  Specification of Letters Patent.  Patented May 23, 1911.

Application filed October 8, 1908, Serial No. 456,813.  Renewed September 30, 1910.  Serial No. 584,766.

*To all whom it may concern:*

Be it known that I, GEORGE G. KETCHAM, a citizen of the United States, residing at Anamosa, in the county of Jones and State of Iowa, have invented new and useful Improvements in Wagon Hay-Racks, of which the following is a specification.

This invention relates to that class of wagon hay-racks characterized by a longitudinally movable carrier which is loaded with hay from a mechanical loader and which when full is moved to the other end of the rack, so that the space it occupied can be filled with hay, thus dispensing with the slow and laborious method of manually pitching or spreading the hay on the rack in small quantities.

The object of the present invention is to drive the carrier from the wheels of the wagon, together with means for automatically throwing said driving-means out of gear when the carrier arrives at the end of its travel; and with these objects in view, the invention consists in a novel combination and arrangement of parts hereinafter described and more specifically pointed out in the appended claims, reference being had to the drawings hereto annexed.

Figure 1:
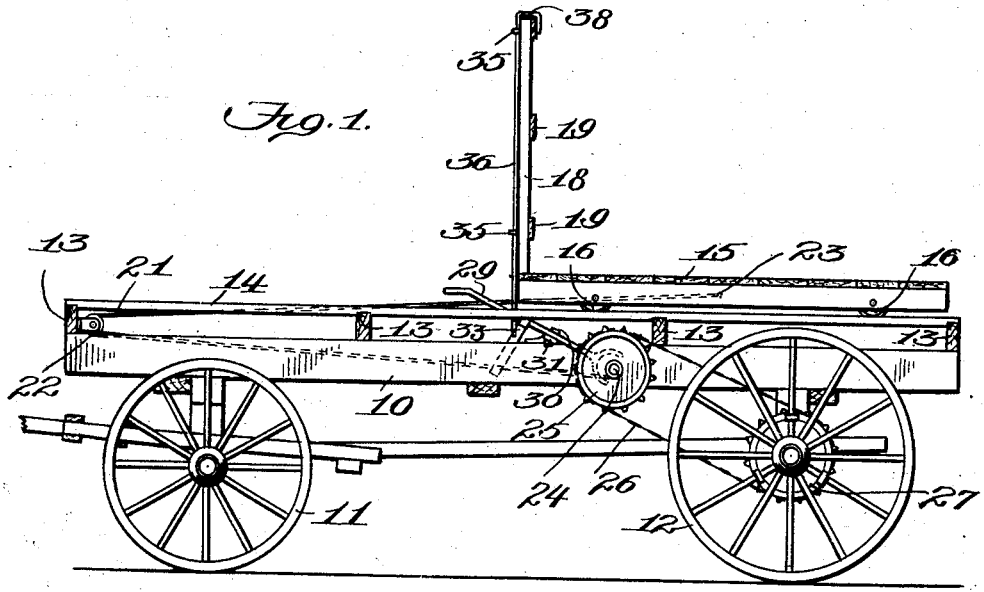
Figure 2:
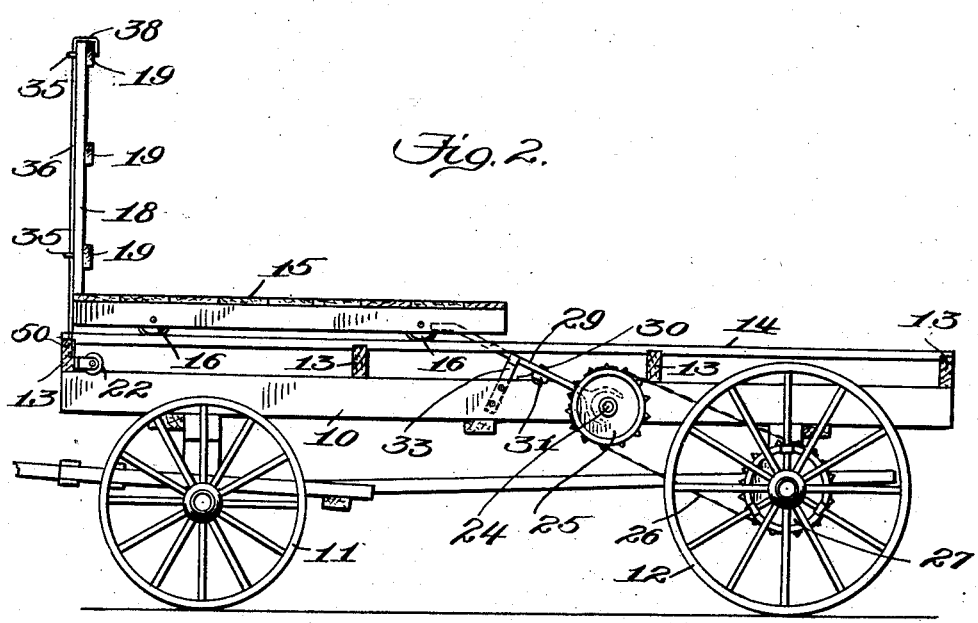

In the drawings:—Figure 1 is a side elevation of the invention, the carrier being shown at the rear end of the rack in position to receive the load. Fig. 2 is a side elevation showing the carrier moved to the front end of the rack, which is its position when loaded. Fig. 3 is a plan view showing the carrier partly broken away. Fig. 4 is a transverse section on the line 4—4 of Fig. 3. Fig. 5 is a detail in perspective of the clutch-mechanism hereinafter referred to. Fig. 6 is a side elevation showing a modified form of mechanism for operating the carrier, and Fig. 7 is a plan view of the modification shown in Fig. 6 with the carrier removed. Fig. 8 is a transverse section on the line 8—8 of Fig. 7.

Referring more particularly to the drawings, 10 denotes the body of an ordinary farm-wagon, 11 are the front wheels, and 12 are the hind wheels thereof. The wagon-body supports a hay-rack comprising cross-sills 13 which project a suitable distance from both sides thereof, and longitudinal strips 14 arranged on said sills. On this rack is mounted for travel lengthwise thereon, from one end to the other, a carrier comprising a platform 15 which is mounted on wheels 16 traveling on rails 17, the latter being preferably formed of ordinary gas-piping. The carrier has at its front end a guard comprising uprights 18 connected by cross-bars 19. In use, upon starting to load the rack, the carrier is positioned at the rear end thereof, and the hay is deposited on the carrier directly from the loader. When the carrier is filled, it is moved to the front end of the rack, and the now empty rear end of the rack is loaded.

The parts thus far described constitute a common form of hay-rack, and nothing is claimed with respect thereto, the present invention being directed to the means for imparting the herein-described movement to the carrier, which means will now be described.

On the wagon-body 10 is mounted in suitable bearings 20, (see Fig. 4) a windlass, the hauling line 21 of which passes over a guide-pulley 22 located at the front end of the rack, and thence to the carrier, to which it is connected as indicated at 23. On the shaft 24 of the windlass is loosely mounted a sprocket-wheel 25 which is geared by a chain 26 to a sprocket-wheel 27 made fast to one of the hind wheels 12 of the wagon. On the windlass-shaft is a slide-clutch 28 for coupling and uncoupling the sprocket-wheel 25. Any ordinary form of slide-clutch may be employed, together with the usual forked clutch-lever. Said lever is indicated by the reference numeral 29 and is fulcrumed at 30 on a bracket 31 mounted on the wagon-body. In connection with the clutch, I also provide means for automatically operating the same to uncouple the sprocket-wheel 25 when the carrier arrives at the front end of the rack, said means comprising the following instrumentalities:—To the wagon-body 10 is secured a flat spring 32 which engages the clutch-lever 29 adjacent to its free end, the tendency of the spring being to throw the lever in a direction to put the clutch into gear, and thus couple the sprocket-wheel 25 to the windlass-shaft 24. To the wagon-body is also secured a spring-latch 33 for holding the clutch-lever in the position it assumes when the clutch is out of gear. (See Fig. 5.) The free end of the clutch lever extends into the path of a cam-block 34 mounted on the carrier, and in guides 35 on the cross-bars 19 of the carrier-guard, is mounted a vertically slidable trip-rod 36, the lower end of which is offset as indicated at 37. The upper end of the trip-rod is formed with a hook 38 which engages over the top cross-bar 19. The object of the trip-rod is to operate the latch 33.

The operation of the clutch-mechanism is as follows:—When the carrier is at the rear end of the rack, and is being loaded, the clutch is out of gear and is held in this position by the engagement of the latch 33 with the clutch-lever 29, and the wagon then travels without imparting motion to the windlass. When the carrier is loaded, the operator rotates the trip-rod 36 to bring its lower end above the latch 33, and then by bearing down on the rod pushes the latch off the clutch lever, whereupon the latter is released and is swung by the spring 32 in a direction to put the clutch in gear, and thus couple the sprocket-wheel 25 to the windlass-shaft 24. The motion of the hind-wheel 12 is then communicated, through the gearing already described, to the windlass-shaft, and the line 21 is wound up, whereby the carrier is pulled to the front end of the rack. When the carrier arrives at the end of its forward travel, the cam-block 34 engages the clutch-lever 29 and causes it to swing in a direction to throw the clutch out of gear, whereupon the sprocket-wheel is uncoupled from the windlass shaft, and the winding of the line 21 is discontinued to stop the carrier. When the clutch-lever swings to throw the clutch out of gear, as stated, the latch 33 engages said lever and holds the same, whereby the clutch is held in this position.

By the wheel-driven carrier, and the clutch-mechanism herein described, the laborious method of manually moving the carrier from one end of the rack to the other is done away with, and there is also a saving of time as the team and the loader are not stopped, the latter continuing to discharge on the rear end of the rack when the carrier moves forwardly. With the exception of throwing the clutch into gear, the mechanism is entirely automatic in its action, and as its parts are few and simple, it is reliable in operation, and can be readily applied to any ordinary wagon hay-rack without altering or modifying the same.

In Figs. 6 to 8 is shown a modified form of mechanism for operating the carrier. A windlass as in the first instance is employed, but the windlass is operated by a friction-wheel 39 mounted on its shaft 24, which wheel is positioned thereon so that it may engage the rim of the hind wheel 12. The shaft 24 is loosely supported at one end in a bearing 40 on the wagon-body 10 so that it can swing laterally, and at its opposite end, the shaft is supported by a bearing-bracket 41 which is pivoted at 42 on the wagon-body. By mounting the windlass shaft as herein described, it may be swung laterally to bring the friction-wheel 39 into operative engagement with the rim of the wheel 12, or out of engagement therewith. To the wagon-body 10 is fulcrumed at 43 a lever 44, one arm of which is connected by a link 45 to the bracket 41, and its other arm by a link 46 to a lever 47 fulcrumed to a bracket 48 secured to the front end of the wagon-body. To the last-mentioned lever is connected a rope 49 which is of sufficient length to extend to the carrier over the top of the guard at the front end thereof. By this system of levers and links a pull on the rope 49 swings the windlass-shaft 24 in a direction to engage the friction-wheel 39 with the rim of the wheel 12, whereupon the motion of the latter is transmitted to said shaft; and the line 21 is wound up to pull the carrier to the front end of the rack. The friction-wheel is held in operative position by continuing the pull on the rope 49 until the carrier reaches its destination, whereupon it is stopped by releasing the rope which disengages the friction-wheel 39 from the wheel 12 and throws the windlass out of action.

One of the longitudinal strips 14 of the rack is provided with openings 50 and 51, which receive the lower end of the trip rod 36 when the carriage is in its forward and rearward positions, respectively, to lock the carriage in such position.

Having thus described my invention what I claim is:

1. The combination with a wagon hay-rack and a carrier mounted for travel thereon, of means actuated by the wheels of the wagon for operating the carrier, a clutch controlling said carrier-operating means, means normally tending to throw said clutch into one position, means associated with the carrier to throw the clutch into the opposite position at the end of movement of the carrier in one direction, latch means to hold the clutch in the latter position, and a latch releasing means associated with the carrier.

2. The combination with a wagon hay-rack and a carrier mounted for travel thereon, of means actuated by the wheels of the wagon for operating the carrier, a clutch controlling said carrier-operating means, means normally tending to throw said clutch into one position, means associated with the carrier to throw the clutch into the opposite position at the end of movement of the carrier in one direction, latch means to hold the clutch in the latter position, and a latch releasing means associated with the carrier, said latch releasing means being further adapted to engage the rack to lock the carrier against movement.

3. The combination with a wagon hay-rack, and a carrier mounted for travel on; of wheel-driven means for operating the carrier, a clutch controlling said means, a clutch-lever, a spring for actuating the lever to throw the clutch into gear, a latch for holding the lever when the clutch is out of gear, and means for operating the latch.

4. The combination with a wagon hay-rack, and a carrier mounted for travel thereon; of wheel-driven means for operating the carrier, a clutch controlling said means, a clutch lever, a spring for actuating the lever to throw the clutch into gear, a latch for holding the lever when the clutch is out of gear and a cam on the carrier adapted to engage the lever for actuating the same to throw the clutch out of gear.

5. The combination, with a wagon hay-rack, and a carrier mounted for travel thereon; of wheel-operated means for effecting the movement of the carrier from one end of the rack to the other; clutch mechanism for controlling said carrier-operating means, said mechanism including a clutch lever; a latch for holding said lever in one position; and a member for releasing said latch and for holding the carrier against movement when in position at either end of said rack.

6. The combination, with a wagon hay-rack, and a carrier mounted for travel thereon; of means for effecting the movement of the carrier from one end of the rack to the other; clutch mechanism for controlling the carrier-operating means, said mechanism including a clutch lever; a latch for holding said lever in one position; and a rod associated with said carrier for holding the same against movement when in position at either end of said rack, and for releasing said latch.

7. The combination, with a wagon hay-rack, and a carrier mounted for travel thereon and provided with a vertical guard; of means for effecting the movement of the carrier from one end of the rack to the other; clutch mechanism for controlling the carrier-operating means, said mechanism including a clutch lever; a latch for holding said lever in one position; and a rod slidably connected with said guard for holding said carrier against movement when in position at either end of said rack, and for releasing said latch.

In testimony whereof I have hereunto set my hand in presence of two subscribing witnesses.

GEORGE G. KETCHAM.

Witnesses:
M. CHAPLIN,
JUDSON ALDERMAN.

---

Copies of this patent may be obtained for five cents each, by addressing the "Commissioner of Patents, Washington, D. C."